F. P. NEHRBAS, C. PLEUTHNER & G. S. SALZMAN.
CONTROLLING DEVICE FOR MOTOR VEHICLES.
APPLICATION FILED DEC. 22, 1906.

1,036,307.

Patented Aug. 20, 1912.
6 SHEETS—SHEET 6.

UNITED STATES PATENT OFFICE.

FREDERICK P. NEHRBAS, CHARLES PLEUTHNER, AND GEORGE S. SALZMAN, OF BUFFALO, NEW YORK, ASSIGNORS TO E. R. THOMAS MOTOR COMPANY, OF BUFFALO, NEW YORK, A CORPORATION OF NEW YORK.

CONTROLLING DEVICE FOR MOTOR-VEHICLES.

1,036,307.  Specification of Letters Patent.  Patented Aug. 20, 1912.

Application filed December 22, 1906. Serial No. 349,034.

*To all whom it may concern:*

Be it known that we, FREDERICK P. NEHRBAS, CHARLES PLEUTHNER, and GEORGE S. SALZMAN, citizens of the United States, residing at Buffalo, in the county of Erie and State of New York, have invented a new and useful Improvement in Controlling Devices for Motor-Vehicles, of which the following is a specification.

This invention relates to a controlling mechanism for motor-vehicles whereby the speed changing mechanism and the engine clutch are controlled.

The object of this invention is to produce a controlling mechanism for this purpose which is simple and durable in construction and reliable in operation and which renders it impossible to change the speed or direction of the vehicle before the engine has been disconnected from the change speed gearing.

In the accompanying drawings consisting of 6 sheets.

Similar letters of reference indicate corresponding parts throughout the several views.

A represents the main frame of the automobile or motor-vehicle which may be of any suitable construction to support the various working parts.

B represents the engine shaft which is connected with the engine so as to be driven directly thereby.

Figure 1:
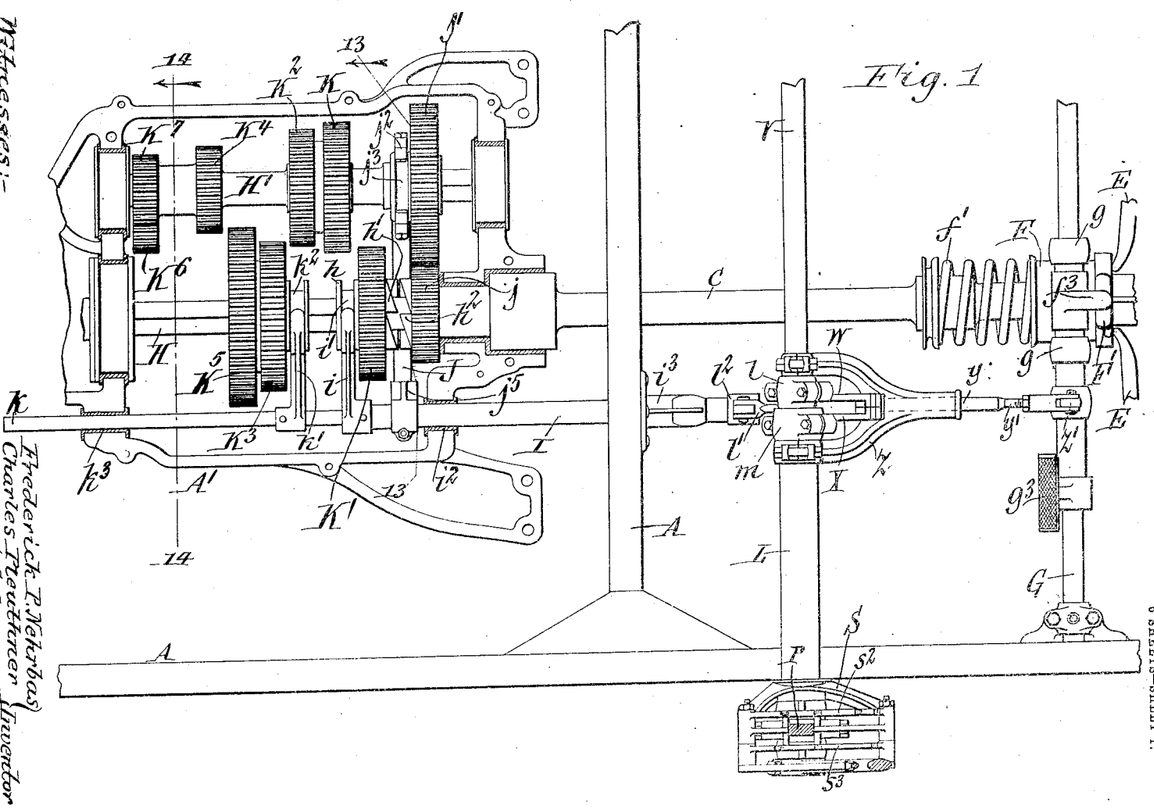
Figure 1 is a fragmentary top plan view, partly in section, of the engine clutch and speed changing mechanism of an automobile showing the application of our improved controlling device.
Figures 9, 11:
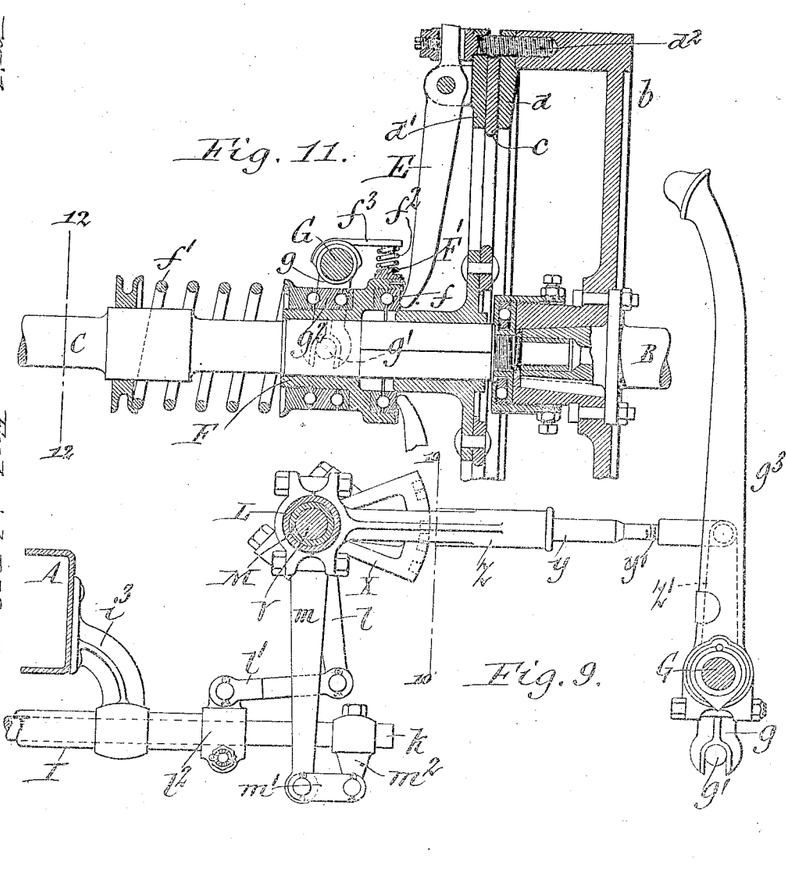
Fig. 9 is a vertical longitudinal section in line 9—9, Fig. 2.
Fig. 11 is a fragmentary vertical longitudinal section of the engine clutch taken in line 11—11, Fig. 12.
Figure 10:
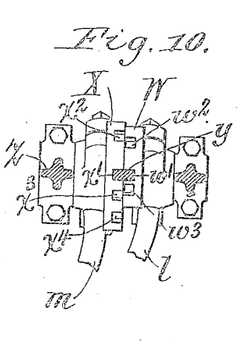
Fig. 10 is a vertical cross section in line 10—10, Fig. 9.
Figure 12:
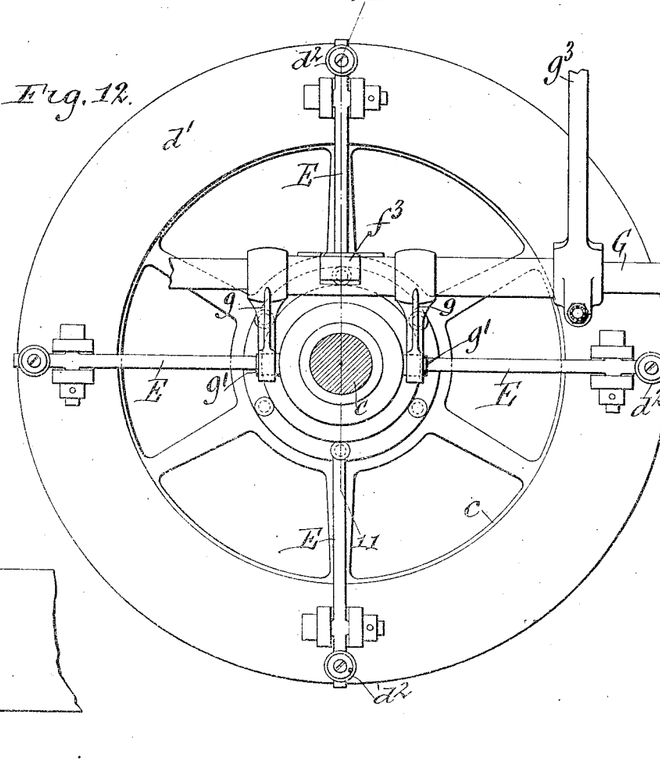
Fig. 12 is a cross section in line 12—12, Fig. 11.

C is the driving shaft which is adapted to be coupled with or uncoupled from the engine shaft by a clutch of any suitable construction, that shown in the drawings, as an example, being constructed as follows: $b$ represents a circular head or wheel secured to the rear end of the engine shaft, $d$, $d^1$ two outer or driving clutch rings which are mounted concentrically on the marginal portion of the engine wheel by means of pins or screws $d^2$, $e$ an intermediate driven clutch ring arranged between the driving rings and connected with the driving shaft so as to be compelled to turn therewith but free to slide lengthwise thereon, $E$ a plurality of clamping levers pivoted on the outer or rear driving ring $d^1$ and each bearing with its outer arm against one of the coupling screws $d^2$, F a shifting sleeve movable lengthwise on the driving shaft and operatively engaging its front end by means of an interposed thrust ring $f$ with the inner arms of the clamping lever, $f^1$ a spring operating constantly to move the shifting sleeve forwardly, G a transverse rock shaft provided with forks or forked rock arms $g$ which engage with pins $g^1$ on opposite sides of a ring $g^2$ which is loosely mounted on the shifting sleeve, and $g^3$ a clutch release pedal or treadle projecting upwardly from the clutch rock shaft, as shown in Figs 1, 11 and 12.

Upon pressing or moving the release pedal forwardly, the forks on its rock shaft move the shifting sleeve rearwardly, thereby permitting the clamping levers to retract and release the pressure of the driving clutch rings from opposite sides of the intermediate driven ring, thereby uncoupling the driving shaft from the engine shaft. When the forward pressure against the release treadle or pedal is removed the spring $f^1$ moves the shifting sleeve forwardly and turns the clamping levers in the direction for causing the driving clamping rings to grip opposite sides of the driven ring and thereby couple the driving and engine shafts. When the clutch is uncoupled it is desirable to stop the rotation of the driving shaft C and the parts connected therewith as quickly as possible. For this purpose a brake shoe $F^1$ is provided which is moved toward and from the periphery of the shifting sleeve F at the front end thereof by means of a spring $f^2$ which yieldingly connects the same with a rock arm $f^3$ projecting forwardly from the pedal shaft G, as shown in Figs. 1 and 11. While the engine clutch is coupled and the rock shaft G is released the arm $f^3$ lifts the shoe $F^1$ clear of the shifting sleeve so as to avoid wear and resistance but when the pedal $g^3$ is pushed forward for uncoupling the engine clutch the shoe $F^1$ is pressed yieldingly against the shifting sleeve F, thereby arresting the rotation of the driven parts promptly.

The speed changing mechanism shown in the drawings to illustrate the application of our improved controlling device is constructed as follows and is designed to move the vehicle forwardly at four different speeds and also backwardly at a slow speed, these different movements being referred to hereafter as the first, second, third and fourth speeds and reverse and corresponding to the lowest speed, next to the lowest speed, next to the highest speed, highest speed and back up, respectively.

H represents a driven shaft which is axially in line with the driving shaft and operatively connected at its rear end with the driving wheels of the vehicle by any suitable intermediate transmitting mechanism.

$H^1$ represents a counter-shaft arranged parallel with and adjacent to one side of the driven shaft.

Figure 13:
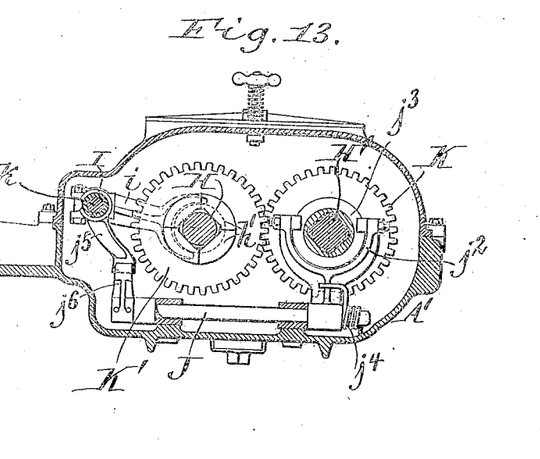
Figs. 13 and 14 are transverse sections of the change speed gearing taken in the correspondingly numbered lines in Fig. 1.
Figure 14:
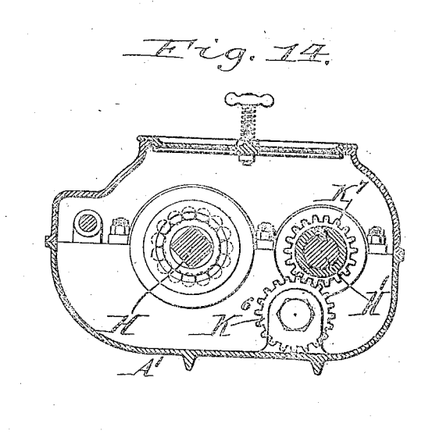

The driving and driven shafts are coupled directly by a clutch comprising a sleeve $h$ mounted on the driven shaft H so as to slide thereon but turn therewith and having teeth $h^1$ at its front end and which are adapted to engage with similar clutch teeth $h^2$ at the rear end of the driving shaft. As shown in the drawings, this connection between the driven shaft and the sleeve $h$ is produced by making the driven shaft square or flat sided and the bore of said sleeve $h$ which receives the same of corresponding cross section, as shown in Fig. 13. The axial movement of this sleeve is produced by means of an outer longitudinally movable shifting tube or rod I arranged parallel to the driven shaft and on that side of the same opposite to the counter-shaft and having a fork $i$ which engages with an annular groove $i^1$ in the periphery of said sleeve. This shifting rod is preferably made hollow and is guided partly in way $i^2$ formed on the front part of the casing $A^1$ which incloses the speed changing gearing and partly in a bracket or hanger $i^3$ secured to the main frame in front of said casing. When the driven shaft is thus connected directly with the driving shaft the counter-shaft is idle. But when motion is to be transmitted from the driving shaft to the driven shaft at a reduced speed or in a reversed direction the counter shaft is active and forms part of the means for transmitting movement from the driving shaft to the driven shaft. When the clutch teeth $h^2$ of the driving shaft are uncoupled, motion is transmitted from the driving shaft to the counter-shaft by means of a main or driving pinion $j$ arranged on the rear end of the driving shaft and meshing with an intermediate gear wheel $j^1$ at the front end of the counter shaft. This gear wheel is mounted upon the counter-shaft so as to be compelled to turn therewith but is free to slide axially thereon so that it may be engaged with or disengaged from the main driving pinion. For this purpose the front portion of the counter-shaft is made square or flat sided and the bore of the intermediate or main gear wheel $j^1$ which receives the same is made of corresponding cross section. As shown in Fig. 1, the intermediate gear wheel $j^1$ intermeshes with the driving pinion. When the shifting sleeve $h$ is moved forwardly for coupling the driving shaft directly with the driven shaft, the intermediate gear wheel $j^1$ is also moved forwardly out of mesh with the driving pinion but when the sleeve is again moved backwardly for uncoupling the driving and driven shafts, the intermediate gear wheel is moved rearwardly into engagement with the driving pinion. This relative movement of these parts may be effected by various means but preferably by the means shown in Figs. 1 and 13 of the drawings which consist of a transverse rock shaft J journaled transversely in the lower part of the gear casing and provided at one end with an upwardly projecting fork $j^2$ which engages with an annular groove $j^3$ in the hub of the intermediate gear wheel, a spring $j^4$ operating to turn the rock shaft J and said fork backwardly, and a tappet $j^5$ depending from the hollow shifting rod I and adapted during the last portion of its forward movement with said rod to engage with an upwardly projecting arm $j^6$ on the rock shaft J and turn the same forwardly. This forward movement of the latter takes place simultaneously with the last portion of the forward movement of the shifting sleeve $h$ while coupling its teeth with those of the driving shaft so that the intermediate gear wheel $j^1$ is at the same time disengaged from the driving pinion. The first portion of the backward movement of the shifting sleeve $h$ for uncoupling its teeth from those of the driving shaft permits the spring $j^4$ to turn the rock shaft backwardly and engage the intermediate gear wheel with the driving pinion.

For driving the driven shaft at third speed or next to the highest, the counter-shaft while being connected with the driving shaft by the intermediate gear wheel and driving pinion is also connected with the driven shaft by two intermeshing third speed gear wheels K, K¹, one of which is secured to the counter shaft in rear of the intermediate or main gear wheel j¹ and the other to the clutch sleeve h.

After the shifting sleeve h has been moved backwardly sufficiently to disengage its teeth from those of the driving shaft, the gear wheel K¹ on the same is still disengaged from its companion gear wheel K on the counter shaft, as shown in Fig. 1, in which position of the parts the counter shaft is rotated from the driving shaft but this movement is not transmitted to the driven shaft. Upon continuing the backward movement of the shifting sleeve h together with its gear wheel K¹ until the latter is in mesh with the gear wheel K of the counter-shaft then the counter shaft will be operatively connected with the driven shaft and the movement of the driving shaft will be transmitted to the driven shaft at the third speed or next to high speed.

For the purpose of rotating the driven shaft at second speed or next to low speed, the gear wheel K¹ is again moved forwardly out of engagement from the gear wheel K into the position shown in Fig. 1 and the counter shaft is connected with the driven shaft by a second speed pinion K² secured to the counter-shaft in rear of the gear wheel K and a second speed gear wheel K³ mounted on the driven shaft so as to be compelled to turn therewith but free to slide axially thereon into mesh with the second speed pinion. The hub of the second speed gear wheel for this purpose has the bore in its hub made of square or flat sided shape to correspond with the cross section of the driven shaft upon which it slides. The second speed gear wheel is moved forwardly on the driven shaft when it is desired to engage the same with the second speed pinion but at all other times the second speed gear wheel is moved rearwardly on its shaft sufficient to clear its companion pinion, as shown in Fig. 1.

When slow or first speed is desired the driving, counter and driven shafts are operatively connected by a first speed pinion K⁴ secured to the counter shaft in rear of the second speed pinion and a first speed gear wheel K⁵ mounted on the driven shaft to turn therewith but slidable axially thereon into engagement with the first speed pinion, the hub of the first speed gear wheel having the bore of its hub constructed of flat sided form to fit the corresponding shape of the driven shaft.

In order to reverse the movement of the vehicle, the first or low speed gear wheel K⁵ is moved axially on the driven shaft into mesh with an idle reversing pinion or gear pinion K⁶ which latter intermeshes constantly with a main reversing pinion K⁷ secured to the counter-shaft in rear of the low speed pinion.

The second speed and low speed gear wheels K³, K⁵ are preferably connected and the same are caused to move axially together on the driven shaft by means of an axially movable shifting rod k arranged parallel to the driven shaft and provided with a fork k¹ which engages with an annular groove k² in the hub of the second speed gear wheel. This shifting rod is arranged with its front part within the hollow shifting rod I so as to be guided therein while its rear part is guided in a way k³ on the rear part of the gear casing.

The relative arrangement of the second and low speed gear wheels is such that after the second speed gear wheel has been moved rearwardly out of engagement from its companion pinion, the low speed gear wheel stands forwardly of the low speed pinion, as shown in Fig. 1. Upon continuing the backward movement another step after these gear wheels reach this position, the low speed gear wheel will be engaged with the low speed pinion. Another rearward step of the second speed and low speed gear wheels causes the low speed gear wheel to stand between the low speed pinion and the reversing pinions in which position this gear wheel is idle. During the next or final rearward step of the low speed gear wheel the same engages with the idle reversing pinion. While the second speed gear wheel is out of engagement from its companion pinion and moving with the low speed gear wheel its movement is without effect.

Figures 2, 3, 4, 6:
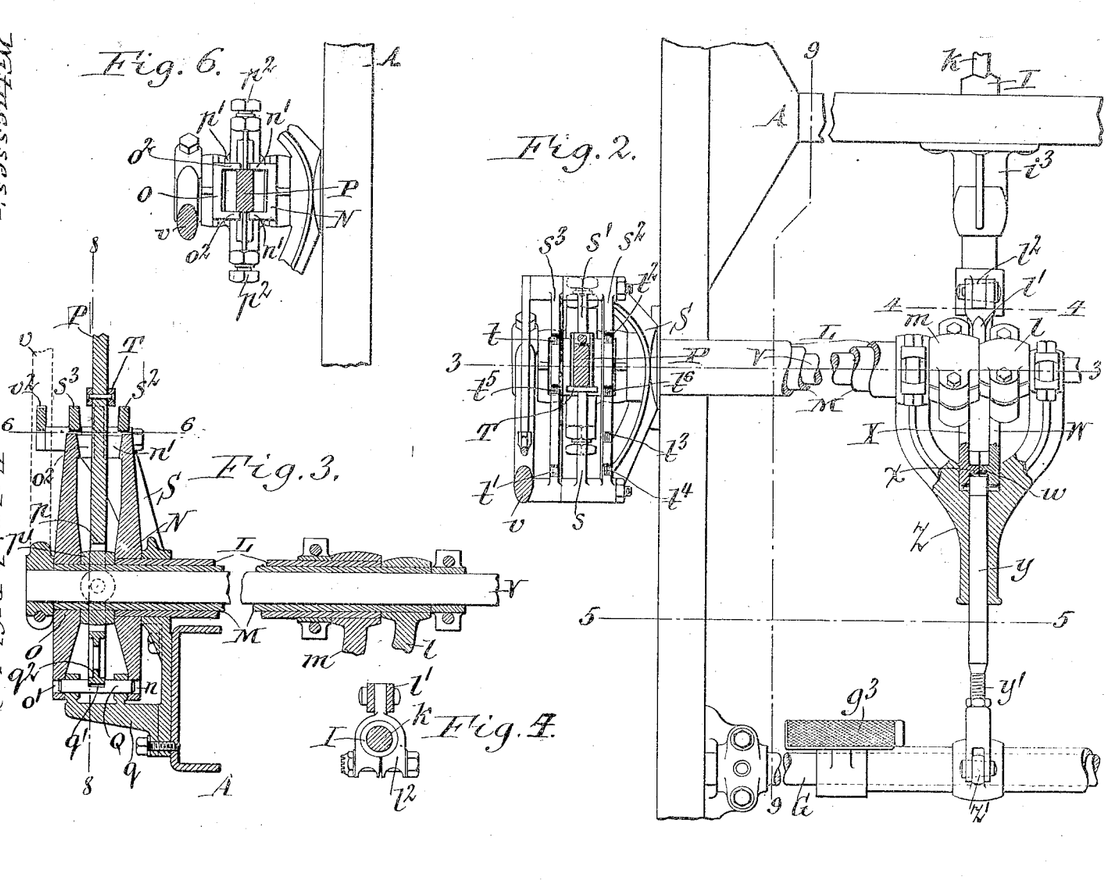
Fig. 2 is a similar view, on an enlarged scale, of the controlling device detached from the parts which are operated thereby.
Figs. 3, 4 and 5 are vertical transverse sections in the correspondingly numbered lines in Fig. 2.
Fig. 6 is a fragmentary horizontal section in line 6—6, Fig. 3.
Figure 5:
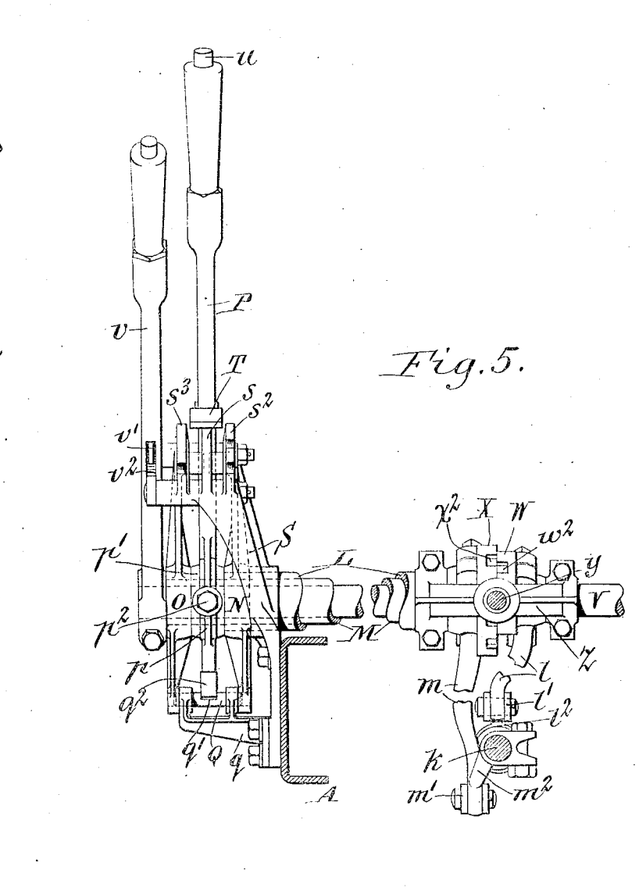

The mechanism whereby the inner and outer shifting rods K, I are actuated for producing the above described changes of speed and direction of movement is constructed as follows: L represents an outer hollow controlling rock shaft and M an inner hollow controlling rock shaft arranged within the outer hollow shaft, these shafts being mounted transversely and horizontally so as to turn concentrically relatively to each other on the frame between the engine clutch and the change speed gearing. The inner controlling rock shaft projects inwardly beyond the outer hollow shaft and is operatively connected with the outer hollow shifting rod I at the front end thereof by means of a depending rock arm l secured to the inner hollow shaft and connected at its lower end by a link l¹ with a clamp l² on the front end of the outer shifting rod, as shown in Figs. 3, 5 and 9. The outer controlling rock shaft is operatively connected with the inner shifting rod by a rock arm $m$ depending from its inner end and connected by a link $m^1$ with a clamp $m^2$ at the front end of the inner shifting rod, as shown in Figs. 3, 5 and 9.

Upon the outer end of the outer rock shaft L is rigidly mounted a coupling rock lever N having a downwardly projecting lower arm provided with a horizontally locking opening or recess $n$ and an upwardly projecting upper arm which is provided with a pair of laterally projecting lugs $n^1$ forming a coupling jaw or socket between them. The outer end of the inner hollow shaft is also provided with an upright coupling rock lever O the lower arm of which is provided with a horizontal locking recess or opening $o^1$ while its upper arm is provided with a pair of laterally projecting lugs $o^2$ which form a coupling jaw or socket between them. In the normal central position of both coupling levers their locking openings are horizontally in line and the coupling jaws on their upper arms are also in line and face each other, as shown in Figs. 3 and 6.

P represents a controlling lever which may be operatively connected with either of said coupling levers for shifting the parts of the change speed gearing connected therewith. This controlling lever is arranged vertically between the two coupling levers and is provided with an open hub $p$ through which the adjacent portion of the inner hollow shaft M passes. Between the coupling levers a swivel collar or sleeve $p^1$ is mounted to rotate freely on the adjacent portion of the inner hollow shaft but is confined against axial movement thereon by the hubs of the coupling levers which engage against opposite ends of the swivel collar. The controlling lever is pivoted so as to be capable of turning laterally by means of two pivot screws $p^2$ arranged in horizontally opposite sides of its hub and turning in seats or sockets formed in diametrically opposite sides of the swivel collar. By this means the controlling lever is capable of moving forwardly and backwardly in a vertical plane concentrically with the axis of the coupling levers and their shafts and also transversely or laterally in a plane at right angles to the plane of rotation of said coupling levers.

While in its central position, the controlling lever projects partly into the coupling jaws or sockets of both coupling levers but upon turning the lever laterally inward it will be fully engaged with the socket of the inner coupling lever and wholly disengaged from the outer coupling lever while upon swinging the controlling lever laterally outward in full extent it will be wholly disengaged from the socket of the inner coupling lever and fully engaged with the socket of the outer coupling lever. Upon turning the controlling lever concentrically with these levers while thus moved laterally into full engagement with the socket of either one of these levers, the respective coupling lever and the parts connected therewith will be turned with the controlling lever about the axis of the hollow shafts.

In order to hold at rest the coupling lever which is disconnected from the controlling lever and prevent those parts which are operatively connected with said coupling lever from being shifted while the controlling lever is connected with the other coupling lever and shifting the parts connected therewith, an automatic locking device is provided which is constructed as follows: Q represents a reciprocating locking bolt or pin which is guided on a stationary bracket $q$ so as to be movable in a plane parallel to the axis of the hollow shafts and coupling levers. This locking bolt is arranged between the lower arms of the coupling levers in position to engage with the locking openings in both of the coupling arms when the same are in their central position or with the locking opening of only one of said coupling levers when the other coupling lever is being turned about its axis by the controlling lever. This locking bolt is provided on its upper side with a notch or recess $q^1$ with which engages the peripheral portion of a segment $q^2$ arranged on the controlling lever below its pivot and curved concentrically with the axis of the swivel collar, coupling levers and controlling shafts. In the central upright position of the controlling lever, the segment at its lower end shifts the locking bolt Q so that opposite ends of the latter project partway into the locking openings of both coupling levers whereby both of the same are held against turning and the change speed mechanism connected therewith cannot be shifted while the controlling lever is in this position. But when the upper part of the controlling lever is shifted laterally so as to fully engage the coupling socket of one of the coupling levers, the segment at its lower end withdraws the locking bolt from the locking opening of the respective coupling lever and pushes the same fully into the locking opening of the other coupling lever, thereby permitting the unlocked coupling lever to turn with the controlling lever about the axis of the controlling shafts for shifting the parts of the change speed gearing connected therewith while the other locked coupling lever is securely held against turning with the controlling lever and the parts of the change speed gearing connected with the inactive coupling lever are positively held against displacement. Upon turning the controlling lever forwardly or backwardly with one of the coupling levers, the segment at its lower end moves circumferentially through the notch of the locking bolt Q without disturbing its position but holding the same in engagement with the locking opening of the inactive coupling lever in the various positions which the controlling lever may be shifted. In the central position of the controlling lever both of the coupling levers are also in their central position and at this time the parts of the change speed gearing are in the position indicated in Fig. 1 in which the clutch teeth $h^1$ are uncoupled and only the intermediate gear wheel $j^1$ and driving pinion $j$ are in mesh so that no motion is transmitted from the driving shaft to the driven shaft and the automobile is at rest.

Upon swinging the controlling lever laterally outward so that the same is coupled with the outer coupling lever the third speed gear wheel, the clutch teeth $h^1$ and the main gear wheel $j^1$ are operatively connected with the controlling lever, and when thus coupled a backward movement of the controlling lever about the axis of the controlling shafts causes the outer shifting rod I to move into its foremost position in which the clutch teeth $h^1$ are engaged with those of the driving shaft and the intermediate gear wheel $j^1$ is moved forwardly out of mesh with the driving pinion $j$ while upon moving the controlling lever forwardly from its central position together with the outer coupling lever, the clutch teeth $h^1$, $h^2$ are uncoupled, the third speed gear wheels K, $K^1$ are coupled and the intermediate gear wheel $j^1$ intermeshed with the driving gear wheel.

Upon moving the controlling lever laterally inward so that the same is connected only with the inner coupling lever the same is operatively connected with the outer controlling shaft and the inner shifting rod $k$. Upon turning the controlling lever backwardly while in this position, the second speed gear wheel $K^3$ will be moved forwardly from its idle position into engagement with the second speed pinion $K^2$. If the controlling lever while thus coupled only with the inner coupling lever is moved from its central position one step forwardly the low speed gear wheel $K^3$ will be shifted rearwardly into engagement with the low speed pinion $K^4$ and upon shifting the controlling lever another step forward while thus connected with the inner coupling lever, the low speed gear wheel $K^5$ will be shifted rearwardly into mesh with the reversing idle pinion $K^6$.

Means are provided whereby the controlling lever after being turned either forwardly or backwardly for coupling a set of change speed gears must always be returned to its central or neutral position and thus uncouple that particular set or pair of gears before the same can be shifted for coupling another set or pair of gears. The means for this purpose shown in the drawings consist of two longitudinal central stop guide bars $s$, $s^1$ which are arranged in front and in rear of the controlling lever while in its central upright position and which are separated by an intervening space or throat through which the controlling lever may be swung laterally into sole engagement with either of the coupling levers, inner and outer guide bars $s^2$, $s^3$ arranged lengthwise on opposite sides of the central guide bars and separated therefrom by intervening spaces forming guideways or slots into which the controlling lever moves when turned forwardly or backwardly with either of said coupling levers, and a stationary bracket S supporting said guide bars.

Figure 8:
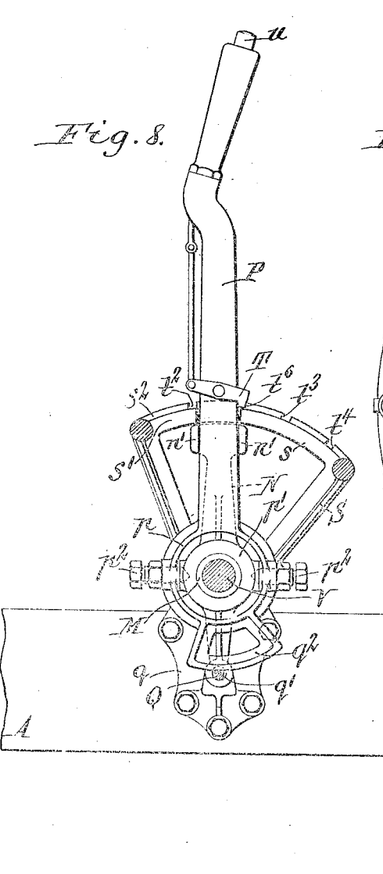
Fig. 8 is a vertical longitudinal section of the same in line 8—8, Fig. 3.

While in its central upright position the controlling lever is arranged between the opposing inner ends of the central guide or stop bars $s$, $s^1$, as shown in Figs. 2, 3 and 8, whereby the same at this time is prevented from being moved either forwardly or backwardly, thus rendering it impossible for the controlling lever to turn both coupling levers at the same time and produce confusion of the change speed gearing.

For the purpose of retaining the controlling lever in the various positions into which it is shifted, the same is provided with a locking dog or pawl T which is adapted to engage with notches $t$, $t^1$, $t^2$, $t^3$, $t^4$, $t^5$, $t^6$ formed in the upper side of the outer and inner guide bars and corresponding, respectively, to the positions which the change speed gearing assumes during the fourth, third, second and first speeds forward, and backup, and the central position of the controlling lever while connected with the outer and inner coupling levers. The guide bars $s^2$, $s^3$ as shown are curved concentrically with the axis on which the controlling lever moves forwardly or backwardly and the central or stop guide bars have their upper surface lower than those of the side guide bars to permit the dog T to enter the notches of the side bars. The locking pawl is pivoted on the controlling lever and manipulated by means of a finger piece $u$ guided in the handle of the controlling lever and connected with the locking dog in a well known manner.

Figure 7:
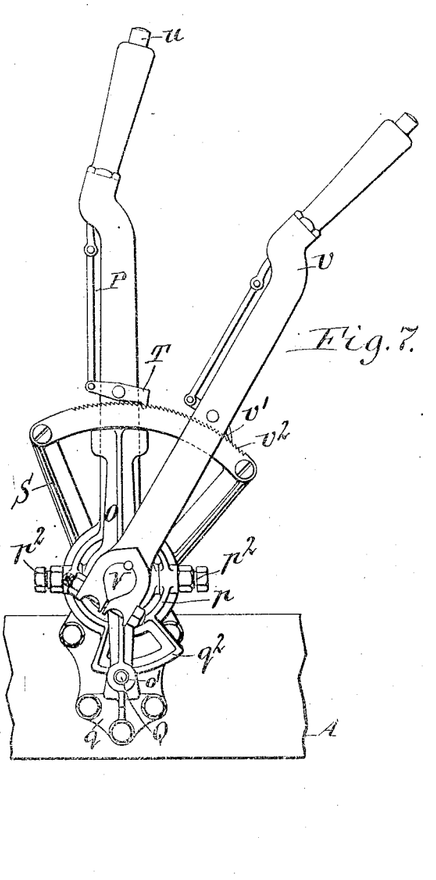
Fig. 7 is a side elevation of the controlling device.

Within the inner controlling shaft is arranged the rocking brake shaft V which is connected at its inner end by any suitable means with the brake mechanism while its outer end is provided with an upright brake lever $v$ which for convenience is arranged adjacent to the controlling lever. This brake lever is provided with a pawl $v^1$ which engages with a tooth segment $v^2$ secured to the bracket S, as shown in Figs. 1 and 7.

In order to prevent the change speed gearing from being manipulated excepting when the driving shaft is disconnected from the engine shaft the following means are provided: W, X represent two locking segments arranged side by side and secured respectively to the inner ends of the inner and outer controlling shafts so as to project forwardly therefrom, as shown in Figs. 1, 2, 9 and 10. At the periphery of these locking segments the same are provided with segmental flanges $w$, $x$, respectively, which face each other. The locking segment of the inner controlling shaft has its flange provided with three notches $w^1$, $w^2$, $w^3$ corresponding to the central position of the controlling lever and also the forward and backwardly turned positions of this lever while connected with the outer coupling lever in which the change speed gearing is set at third and fourth speeds. The locking segment of the outer controlling shaft is provided in its flange with four notches $x^1$, $x^2$, $x^3$, $x^4$ corresponding respectively to the central position of the controlling lever and also to the positions which it occupies in moving forwardly and backwardly with the inner coupling lever while shifting the speed gears to produce second and first speeds and backup. $y$ represents a radially movable locking bolt which is adapted to simultaneously lock and unlock the segments W, X. This bolt is guided in a bracket $z$ which is mounted concentrically on the outer hollow shaft and the brake shaft. The locking bolt $y$ is moved forwardly and backwardly for disengaging the same from both segments or engaging the same therewith by means of an upright rock arm $z^1$ arranged on the adjacent portion of the engine clutch shaft and connected with said locking bolt by a rod $y^1$, as shown in Figs. 1, 2 and 9. While the engine shaft is coupled with the driving shaft by means of the engine clutch, the pedal $g^2$ of the rock shaft G is in its backward position and the locking bolt $y$ engages with the opposing pair of notches in the locking segments which are at this time in line with the locking bolt. When the operator desires to change to another speed or to reverse the movement of the automobile, it is necessary to first push the pedal forwardly in order to release the locking bolt $y$ from the segments whereby at the same time the engine clutch is uncoupled and the driving shaft is disconnected from the engine shaft. While the pedal is in its forward position and the locking bolt is thus withdrawn from the segment, the controlling lever may turn either the inner or outer controlling rock shaft and the particular parts of the speed gearing connected therewith for obtaining the desired change or direction of motion and during this movement of the speed gearing either one or the other of the locking segments is also rotated and brings that particular notch in its flange opposite the locking bolt corresponding to the particular speed at which the gearing has been set. While one segment is thus turning in harmony with the parts of the speed gearing with which it is connected, the other locking segment is prevented from turning by reason of the locking bolt Q engaging with the locking arms of the inactive coupling lever, thereby preventing displacement of the inactive gearing and the parts connected therewith at this time. Upon releasing the pedal after the gears have been set at the desired speed, the same is moved backwardly together with the locking bolt by means of the spring $f$, whereby the locking bolt is engaged with the particular pair of notches in the flanges of the locking segments which at this time are in line with the locking bolt. It will thus be observed that disarrangement of the speed gearing is impossible, inasmuch as a change in the relation of the gearing cannot be effected until after the previously coupled gear wheels have been disconnected, and that such changes cannot be effected while the speed gearing is connected with the engine, thereby absolutely preventing injury of the same. Nor is it possible for the engine clutch to be coupled except when the change speed gearing has been fully shifted from one position to another.

We claim as our invention:

1. A controlling device for motor-vehicles, comprising two concentric shafts arranged one within the other and connected respectively with the parts to be controlled, coupling levers secured respectively to the corresponding ends of said shafts provided on their opposing lower arms with locking openings and on their opposing upper arms with sockets, a controlling lever arranged between said coupling levers and capable of moving concentrically forward or backward relatively thereto and also swinging laterally for engaging on one side of its axis with the socket of either coupling lever, a swivel collar journaled on one of said shafts between said coupling levers and connected on its opposite sides by transverse pivots with opposite sides of the hub of the controlling lever, a locking bolt adapted to engage at opposite ends with the locking opening of one or the other coupling lever and provided centrally with a notch or recess, and a segment arranged on said controlling lever on the opposing side of its axis and engaging with the notch of said locking bolt, substantially as set forth.

2. A controlling device for motor-vehicles, comprising two controlling rock shafts, one of which is connected with the high gears and the other with the lower gears of the change speed gearing to be shifted, a clutch rock shaft operatively connected with the engine clutch, and a locking device which is actuated by said clutch shaft and which operates to simultaneously hold or release both of said controlling shafts, substantially as set forth.

3. A controlling device for motor-vehicles, comprising two controlling rock shafts arranged one within the other and operatively connected with different parts of the change speed gearing to be shifted, two segments secured respectively to said rock shafts and provided in their opposing peripheral portions with rows of recesses, a locking bolt movable into and out of the recesses of both segments, a clutch rock shaft for operating the engine clutch, and a rock arm arranged on said clutch shaft and connected with said locking bolt, substantially as set forth.

4. A controlling device for motor-vehicles, comprising two controlling rock shafts arranged one within the other and operatively connected with different parts of the change speed gearing to be shifted, two segments secured respectively to said rock shafts and provided in their opposing peripheral portions with rows of recesses, a locking bolt movable into and out of the recesses of both segments, a clutch rock shaft for operating the engine clutch, a rock arm arranged on said clutch shaft and connected with said locking bolt, and a bracket mounted concentrically relatively to said controlling shafts and provided with a guideway in which said locking bolt is guided, substantially as set forth.

5. A controlling device for motor-vehicles, comprising two controlling rock shafts arranged one within the other and operatively connected with different parts of the change speed gearing to be shifted, two segments secured respectively to said rock shafts and provided in their opposing peripheral portions with rows of recesses, a locking bolt movable into and out of the recesses of both segments, a clutch rock shaft for operating the engine clutch, a rock arm arranged on said clutch shaft and connected with said locking bolt, coupling levers secured respectively on said controlling rock shafts and each provided on its upper arm with a socket and in its lower arm with a locking opening, a controlling arm movable forwardly and backwardly about the axis of said controlling shafts and also laterally into engagement with the socket of either coupling lever, a controlling locking bolt adapted to engage opposite ends with the locking openings of said coupling levers and having a recess in its central part, and a segment arranged on said controlling lever and engaging its peripheral portion with the recess of said controlling locking bolt, substantially as set forth.

6. The combination in a transmission mechanism of movable controlling members, a pair of rock shafts for actuating said members and notched sectors carried by said rock shafts, means for engaging said notches for locking said rock shafts together, and means controlled by said notch engaging means for actuating a brake.

Witness our hands this 17th day of December, 1906.

FREDERICK P. NEHRBAS.
CHARLES PLEUTHNER.
GEORGE S. SALZMAN.

Witnesses:
W. H. FLOWERS,
H. J. HASS.